July 19, 1949.     T. P. McCLOSKEY, JR     2,476,314
MOWING MACHINE
Filed March 20, 1944     3 Sheets-Sheet 3
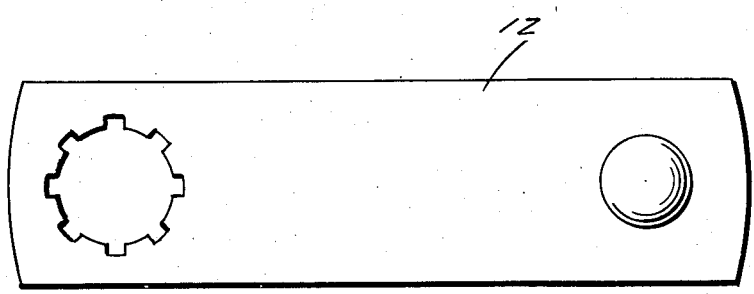
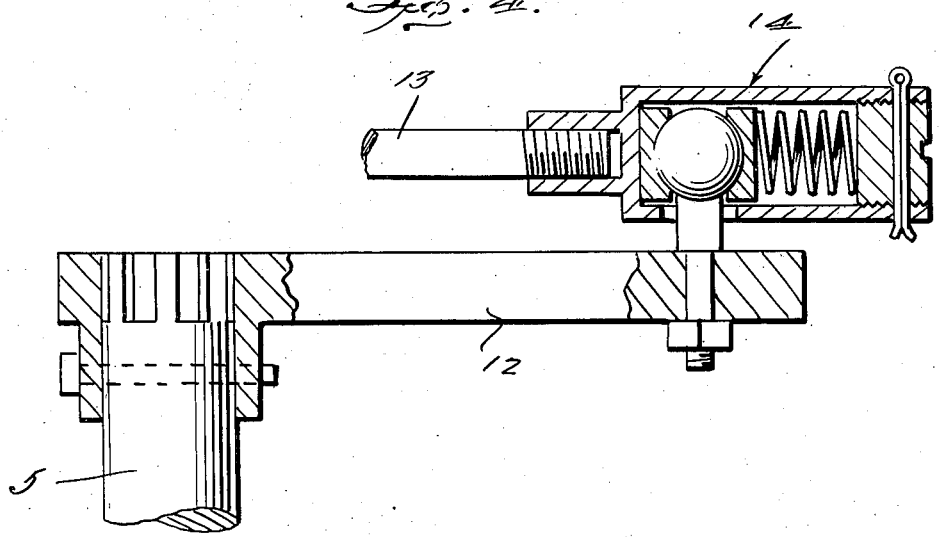
Inventor
*Thomas P. McCloskey Jr.*
By *Clarence A. O'Brien and Harvey B. Jacobson*
Attorneys

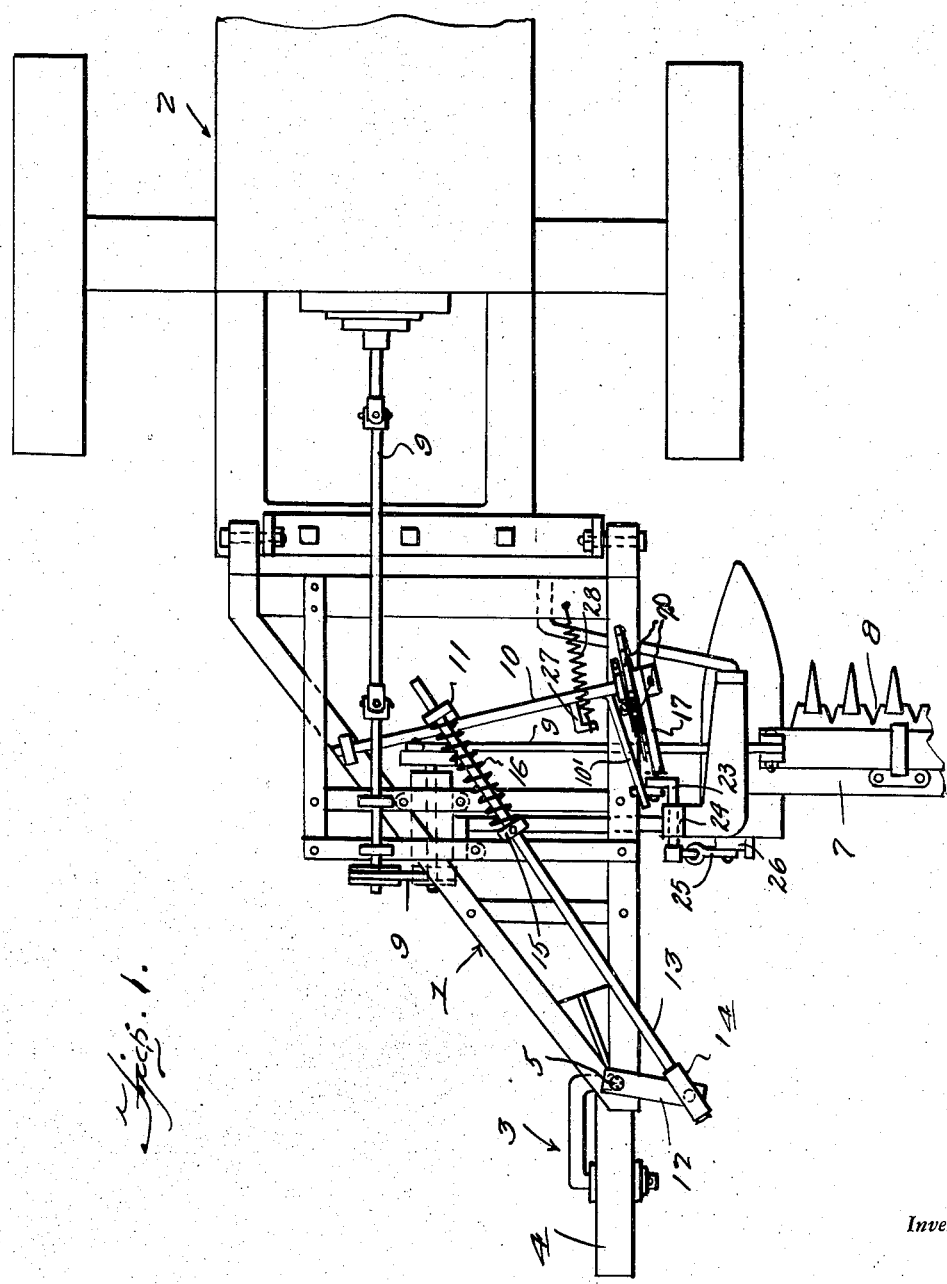

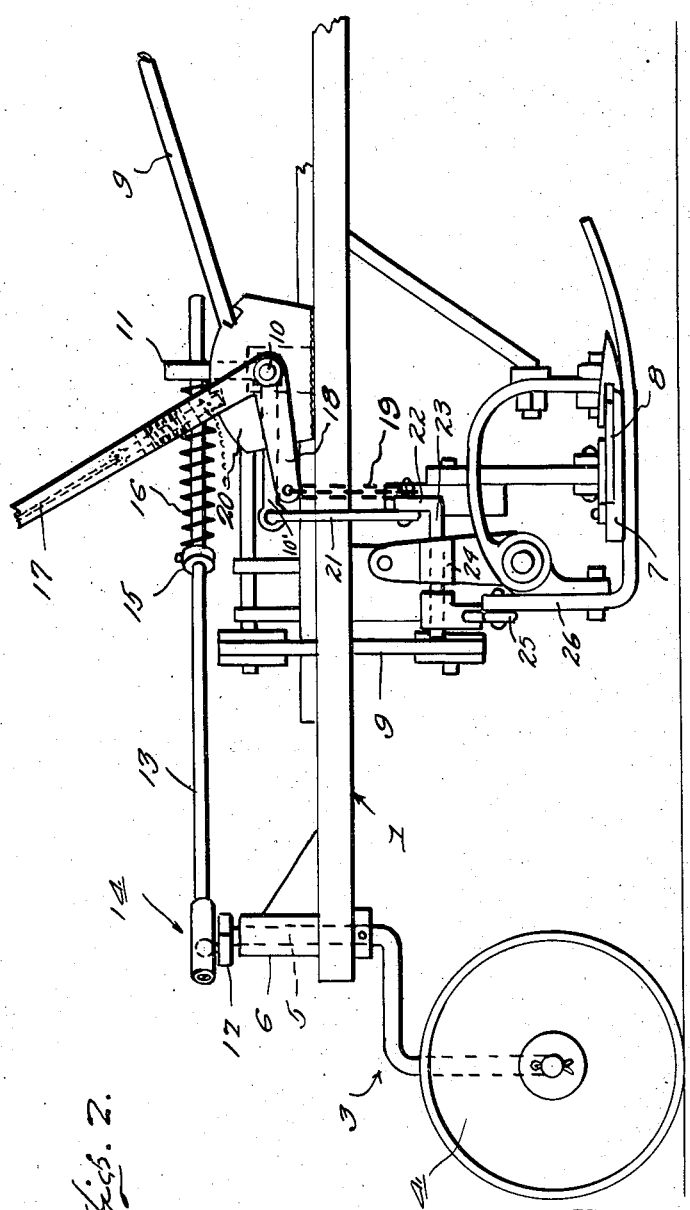

UNITED STATES PATENT OFFICE 2,476,314

MOWING MACHINE

Thomas P. McCloskey, Jr., Anniston, Mo.

Application March 20, 1944, Serial No. 527,269

4 Claims. (Cl. 56—25)

The present invention relates to new and useful improvements in mowing machines of the type comprising a vertically swinging cutter bar with a knife mounted for reciprocation thereon, and has for its primary object to provide, in a manner as hereinafter set forth, novel means for automatically raising said cutter bar when the machine is turned in a predetermined direction or backed.

Another very important object of the invention is to provide unique means for automatically raising the cutter bar of a mowing machine when turning in a predetermined direction or backing, which means may be incorporated in various types of machines without the necessity of making material structural alterations therein.

Other objects of the invention are to provide a mowing machine of the character described which will be comparatively simple in construction, strong, durable, highly efficient and reliable in operation, compact, light in weight and which may be manufactured at low cost.

All of the foregoing, and still further objects and advantages of the invention, will become apparent from a study of the following specification, taken in connection with the accompanying drawings wherein like characters of reference designate corresponding parts throughout the several views, and wherein:

Figure 1 is a top plan view of a mowing machine constructed in accordance with the present invention.

Figure 2 is a view in side elevation thereof.

Figure 3 is a detail view in top plan of the caster-operated arm.

Figure 4 is a view principally in vertical section through the caster-operated arm and the coupling of the shaft-rocking rod.

Referring now to the drawings in detail, it will be seen that the embodiment of the invention which has been illustrated comprises a substantially triangular metallic frame 1 having its forward end mounted in any suitable manner on the rear end of a tractor 2 to be drawn thereby. A caster 3 supports the rear end of the frame 1. It will be observed that the wheel 4 trails the vertical shaft or shank 5 of the caster 3. Also, the shank 5 of the caster 3 projects above the bearings 6 for said shank on the frame 1 for a purpose to be presently set forth.

Mounted for vertical swinging movement on the frame 1 is a laterally projecting cutter bar 7 having mounted for reciprocation thereon a knife 8. The knife 8 is connected in any suitable manner, as at 9, to the usual power take-off of the tractor 2. A shaft 10 is rockably mounted on the frame 1. The shaft 10 is provided with an extending arm 10' to which is secured one end of a link 21, the opposite end of which is secured to an upstanding lever 22 comprising an extension of a rod 23, journalled for rotation in a bracket 24 carried by the frame 1. From the opposite end of rod 23 a link 25 extends to an arm 26 fixedly secured to cutter bar 7. Thus it will be seen that when the shaft 10 is rotated in a manner to be more fully described hereinafter, the arm 10' is raised and through the linkage above described acts on arm 26 to effect an upward or vertical swinging movement of the cutter blade.

A second arm 27 is secured to shaft 10 and engages one extremity of a coil spring 28, the other end of which is secured to the frame 1, the arrangement being such that when shaft 10 is rocked to lift the cutter bar 7, spring 28 exerts a substantial force to aid such lifting. An upstanding arm 11 is fixed on the shaft 10.

Fixed on the projecting upper end portion of the shank 5 of the caster 3 is a horizontal arm 12. A rod 13 has one end connected to the free end portion of the arm 12 by a longitudinally yieldable universal joint 14 of the ball and socket type. The other end portion of the rod 13 is freely reciprocable in an opening which is provided therefor in the upper portion of the arm 11.

A collar 15 is adjustably mounted on the forward portion of the rod 13 rearwardly of the arm 11. A coil spring 16 is mounted on the rod 13 between the collar 15 and the arm 11. Thus, the rod 13 is yieldingly connected to the shaft 10 for rocking said shaft in a direction to raise and lower the cutter bar 7.

The distance between adjustable collar 15 and arm 11 is so chosen, and the compressive strength of the spring 16 is so selected that a certain amount of lost motion is introduced between the collar, the spring and the arm 11. By this manner, when the rod 13 is moved forward from its normal rest position as shown in Figure 1, the spring 16 is initially or precompressed to a predetermined extent and pressure, taking up this lost motion and thus permitting a slight swivelling of the caster wheel without actuation of the bar raising mechanism. Thus, the machine may make slight turns, resulting in slight swivelling action of the caster wheel, without the cutter bar being elevated. The weight of the cutter bar and the frictional resistance of the inter-connecting mechanism are factors which will assist in determining the amount of the lost motion to be necessary for the device. However, upon further forward travel of rod 13, the arm 11, shaft 10, arm 10', link 21, shaft 23 and arm 25 are operated to raise the cutter bar. This operation is effected only by the extremes of turning of the caster encountered when backing or turning the caster a predetermined extent in a predetermined direction during turning of the tractor.

As illustrated in Figures 1 and 2, the arm extends to the right, whereupon when the tractor makes a right turn, the predetermined sharpness of curvature or turning, the mechanism will be operated to raise the cutter bar 7.

In the foregoing paragraphs has been described the operation of the mechanism when the caster 3 is rotated about the vertical axis 5 in a counter-clockwise direction from the position of Figure 1. Assuming that the caster is rotated in a clockwise direction from the position shown in Figure 1, it will be seen that the arm 12 first describes an arc about its axis 5. During the first part of this arc, the rod 13 and collar 15 are moved rearwardly of arm 12, introducing additional lost motion into the mechanism. Since rod 13 can slide freely through the aperture in arm 11, no motion is imparted to the cutter elevating mechanism. Continued clockwise rotation of the arm 12 about its axis 5 passes a dead-center position, wherein the arm 12 and rod 13 are alined on opposite sides of the axis 5. This position obviously represents the maximum effective length of the rod 13 in its use. The ensuing clockwise motion of caster 4 and arm 12 now advances the rod 13, but upon the left side of the line connecting the axis 5 and the aperture in arm 11, and the lost motion is now progressively taken up until the final inward travel of arm 13 operates the cutter elevating mechanism as described above. However, this final inward travel occurs only when the caster wheel 3 has substantially completed 180 degrees of rotation, as when the tractor is backed rather than turned to the right or the left.

It will be thus seen that regardless of which direction the caster wheel turns, in conformity with the direction of the tractor turning, the caster wheel is completely turned through 180 degrees and the cutter bar lifted when the tractor is backed, while when the tractor turns in a predetermined direction for which the arm 12 has been positioned, the mechanism is effective to lift the cutter bar, while turning in the other direction, the mechanism is ineffective or inoperative to elevate the cutter bar.

It is thought that the operation of the invention will be readily apparent from a consideration of the foregoing. Briefly, the construction and arrangement is such that initial swinging movement of the caster 3 will not affect the cutter bar 7 by virtue of the lost motion above mentioned, which merely initially compresses the spring 16. However, when a turn of a predetermined extent, in a predetermined direction corresponding to the position of arm 12 is made, the caster 3, turning relative to the frame 1, moves the rod 13 forwardly through the medium of the arm 12. In this manner, the coil spring 16 is caused to swing the arm 11 forwardly and downwardly for rocking the shaft 10 in a direction to raise the cutter bar 7. When the turn has been completed and the caster 3 straightens out, the cutter bar 7 returns to lowered position by gravity. A hand lever 17 is mounted for swinging movement on the frame 1. The lever 17 comprises, on its pivoted end, an arm 18 which is connected by a chain 19 to the cutter bar raising means. The lever 17 is provided with latching means 20 whereby said lever may be utilized for securing the cutter bar 7 in raised position when desired. When the machine is being backed, the caster 3 may swing in either direction and will completely reverse its position and the shaft 10 will be rocked thereby for raising the cutter bar 7.

It is believed that the many advantages of a mowing machine constructed in accordance with the present invention will be readily understood, and although a preferred embodiment of the machine is as illustrated and described, it is to be understood that changes in the details of construction and in the combination and arrangement of parts may be resorted to which will fall within the scope of the invention as claimed.

What is claimed is:

1. A mowing attachment for tractors consisting of a frame pivotally secured at one end to a tractor, a caster supporting the other end of said frame, a cutter bar supported on said frame and mounted for vertical swinging movement thereon, means supported by said frame responsive to a predetermined extent of swiveling of said caster in a predetermined direction for elevating said cutter bar.

2. A mowing attachment for tractors consisting of a frame pivotally secured at one end to a tractor, a caster supporting the other end of said frame, a cutter bar supported on said frame and mounted for vertical swinging movement thereon, means supported by said frame responsive to a predetermined extent of swiveling of said caster in a predetermined direction upon forward travel of the tractor for elevating said cutter bar, said means being inoperative during an initial predetermined amount of swiveling movement of said caster.

3. A mowing attachment for tractors consisting of a frame pivotally secured at one end to a tractor, a caster supporting the other end of said frame, a cutter bar supported on said frame and mounted for vertical swinging movement thereon, means supported by said frame responsive to a predetermined extent of swiveling of said caster in a predetermined direction for elevating said cutter bar, said means having a lost motion rendering the elevating means inoperative during a predetermined, initial swiveling of said caster and operative during the completion of the swiveling movement of said caster in said predetermined direction.

4. A mowing attachment for tractors consisting of a frame pivotally secured at one end to a tractor, a caster supporting the other end of said frame, a cutter bar supported on said frame and mounted for vertical swinging movement thereon, means supported by said frame responsive to a predetermined extent of swiveling of said caster in a predetermined direction for elevating said cutter bar and mechanism for elevating said cutter bar including an arm, a lever secured upon the axis of said caster, a rod pivoted to said lever and having its other end freely slidable in an aperture in said arm, said means including a member associated with said rod and said lever for providing lost motion between said lever and said arm during initial movement of said caster in a predetermined portion of its rotation about its swiveling axis and operable to actuate said elevating mechanism during the remaining portion of said rotation about said swiveling axis.

THOMAS P. McCLOSKEY, Jr.

REFERENCES CITED

The following references are of record in the file of this patent:

UNITED STATES PATENTS

| Number | Name | Date |
|---|---|---|
| Re. 21,819 | Korsmo et al. | June 3, 1941 |
| 1,425,489 | Keagle | Aug. 8, 1922 |
| 1,616,629 | Jordan | Feb. 8, 1927 |